(12) United States Patent
Aparin (10) Patent No.: US 8,706,055 B2
(45) Date of Patent: Apr. 22, 2014

(54) REDUCTION OF SECOND-ORDER DISTORTION CAUSED BY TRANSMIT SIGNAL LEAKAGE

(75) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 565 days.

(21) Appl. No.: 11/690,173

(22) Filed: Mar. 23, 2007

(65) Prior Publication Data

US 2008/0233894 A1    Sep. 25, 2008

(51) Int. Cl.
*H04B 1/44*    (2006.01)

(52) U.S. Cl.
USPC .......................................................... 455/78

(58) Field of Classification Search
USPC ............................................ 455/78, 126, 324
See application file for complete search history.

(56) References Cited

U.S. PATENT DOCUMENTS

| | | | |
|---|---|---|---|
| 5,749,051 A * | 5/1998 | Dent ............................. | 455/324 |
| 6,181,683 B1 | 1/2001 | Chevillat et al. | |
| 6,519,374 B1 | 2/2003 | Stook et al. | |
| 2005/0107051 A1* | 5/2005 | Aparin et al. ................. | 455/126 |
| 2005/0255825 A1 | 11/2005 | Takagi | |
| 2010/0323641 A1* | 12/2010 | Aparin et al. ............. | 455/114.3 |

FOREIGN PATENT DOCUMENTS

| | | |
|---|---|---|
| EP | 1531553 A1 * | 5/2005 |
| JP | 11284536 A | 10/1999 |
| JP | 2000515342 | 11/2000 |
| JP | 2004266356 A | 9/2004 |
| JP | 2006503450 A | 1/2006 |
| KR | 20000067889 | 11/2000 |
| KR | 20040093700 | 11/2004 |
| RU | 2179373 | 2/2002 |
| WO | WO9804050 A1 | 1/1998 |
| WO | WO9956405 | 11/1999 |
| WO | WO0013427 A2 | 3/2000 |
| WO | WO03065602 | 8/2003 |

OTHER PUBLICATIONS

International Search Report and Written Opinion—PCT/US08/057898, International Search Authority—European Patent Office, Jul. 30, 2008.
Taiwan Search Report—TW097110299—TIPO—Sep. 19, 2011.

* cited by examiner

*Primary Examiner* — David Bilodeau
(74) *Attorney, Agent, or Firm* — Ramin Mobarhan (57) ABSTRACT

This disclosure describes techniques for reducing adverse effects of TX signal leakage in a full-duplex, wireless communication system. In particular, the disclosure describes techniques for reducing adverse effects of second order distortion of TX signal leakage. To reduce or eliminate second order distortion of transmit signal leakage, a wireless device squares a combined signal that carries both a desired RX signal and a TX leakage signal. For example, the device may include a device that exhibits a strong, second order nonlinearity to, in effect, square the combined signal. The device subtracts the squared signal from the output of the mixer in the receive path, canceling out at least some of the second-order distortion caused by the mixer. In this manner, the device can reduce the adverse effects of second order distortion of TX signal leakage, and thereby enhance or maintain receiver sensitivity.

30 Claims, 7 Drawing Sheets

REDUCTION OF SECOND-ORDER DISTORTION CAUSED BY TRANSMIT SIGNAL LEAKAGE

TECHNICAL FIELD

This disclosure relates generally to wireless communication and, more particularly, to techniques for reducing adverse effects of transmit signal leakage in a wireless full-duplex communication system.

BACKGROUND

A wireless device in a full-duplex communication system can simultaneously transmit and receive wireless signals to support two-way communication. In a transmit path, a power amplifier amplifies a radio frequency (RF) signal for transmission. The transmit (TX) signal is routed through a duplexer and transmitted via an antenna. In the receive path, a desired (RX) signal is received via the antenna and coupled through the duplexer to a low noise amplifier (LNA). Following amplification by the LNA, the RX signal is filtered and then down-converted to baseband by a mixer. The down-converted RX signal is processed by other components to recover the received data.

In a full-duplex communication system, the transmit path can interfere with the receive path. A portion of the TX signal may be coupled from the duplexer to the receive path, resulting in TX signal leakage. TX signal leakage can cause interference in the desired signal processed by the receive path. Because the transmitter frequency differs from the receiver frequency, the TX signal leakage can be filtered. However, even with filtering, there typically remains a residual amount of the TX signal leakage, causing distortion that can spectrally overlap with the desired RX signal received via the antenna. This distortion can degrade receiver sensitivity. The desired RX signal is the signal received via an antenna, in contrast to the TX signal received via leakage across a duplexer.

SUMMARY

This disclosure describes techniques for reducing adverse effects of TX signal leakage in a full-duplex, wireless communication system. In particular, the disclosure describes techniques for reducing adverse effects of second order distortion of TX signal leakage, which may be caused by non-linearities in a mixer used for down-conversion of a received signal.

In the receive path of a wireless device, the desired RX signal is combined with a TX leakage signal. The combined signal is down-converted to baseband by a mixer. The mixer creates second-order distortion due to its inherent non-linearity. The second order distortion can fall at the same frequencies as those occupied by the desired RX signal and, thus, decrease receiver sensitivity. In particular, the second-order distortion of the residual TX leakage can mask the down-converted, desired RX signal in the baseband.

To reduce or eliminate second order distortion of transmit signal leakage, a device squares the combined signal that carries both the desired RX signal and the TX leakage signal. For example, the device may include a device that exhibits a strong, second order nonlinearity to, in effect, square the combined signal. The device then subtracts the squared signal from the output of the down-conversion mixer in the receive path, canceling out at least some of the second-order distortion caused by the mixer. In this manner, the device can reduce the adverse effects of second order distortion of TX signal leakage, and thereby enhance or maintain receiver sensitivity.

In one aspect, this disclosure provides a wireless receiver comprising a mixer that down-converts an input signal to create a down-converted input signal, a squaring unit that squares the input signal to create a squared input signal, and a subtracting unit that subtracts the squared input signal from the down-converted input signal.

In another aspect, the disclosure provides a method comprising down-converting an input signal to create a down-converted input signal, squaring the input signal to create a squared input signal, and subtracting the squared input signal from the down-converted input signal.

In an additional aspect, the disclosure provides a wireless communication device comprising a radio frequency (RF) transmitter, an RF receiver, an RF antenna, and a duplexer that couples the transmitter and the receiver to the antenna, wherein the duplexer passes a transmit leakage signal to the low noise amplifier. The receiver further comprises a mixer that down-converts an input signal to create a down-converted input signal, a squaring unit that squares the input signal to create a squared input signal, and a subtracting unit that subtracts the squared input signal from the down-converted input signal.

In another aspect, the disclosure provides a wireless receiver comprising an antenna, a duplexer coupled to the antenna, a low noise amplifier coupled to amplify an input signal received via the duplexer and the antenna, wherein the duplexer passes a transmit leakage signal to the low noise amplifier, a filter that filters the amplified input signal, a mixer that down-converts the filtered, amplified input signal to create a down-converted input signal, a squaring unit that squares the filtered, amplified input signal to create a squared input signal, and a subtracting unit that subtracts the squared input signal from the down-converted input signal.

The details of one or more aspects of the disclosure are set forth in the accompanying drawings and the description below. Other features, objects, and advantages of the disclosure will be apparent from the description and drawings, and from the claims.

DETAILED DESCRIPTION

In the receive path of a wireless device, the desired RX signal is combined with a TX leakage signal. The combined signal is down-converted to baseband by a mixer. The mixer creates second-order distortion due to its inherent non-linearity. The second order distortion can fall at the same frequencies as those occupied by the desired RX signal and, thus, decrease receiver sensitivity. In particular, the second-order distortion of the residual TX leakage can mask the down-converted RX signal in baseband.

To reduce or eliminate second order distortion of transmit signal leakage, in accordance with this disclosure, a device may square the combined signal that carries both the desired RX signal and the TX leakage signal. For example, the device may include a unit that exhibits a strong, second order non-linearity to, in effect, square the combined signal. The device then subtracts the squared signal from the output of the down-conversion mixer in the receive path, canceling the second-order distortion caused by the mixer. In this manner, the device can reduce the adverse effects of second order distortion of the TX signal leakage, and thereby enhance or maintain receiver sensitivity.

The techniques described in this disclosure may be used in any of a variety of full-duplex, wireless communication systems. Some examples of full-duplex, wireless communication systems are Personal Communication System (PCS), Digital Cellular System (DCS), and International Mobile Telecommunications-2000 (IMT-2000) systems. As one particular example, the techniques may be applied in a wireless communication device equipped for code division multiple access (CDMA) communication. Examples of wireless communication devices include mobile radiotelephones, satellite telephones, personal digital assistants, wireless communication cards, laptop or desktop computers or associated radio interfaces, wireless access points, digital audio or video devices, video gaming consoles, or the like.

Figure 1:
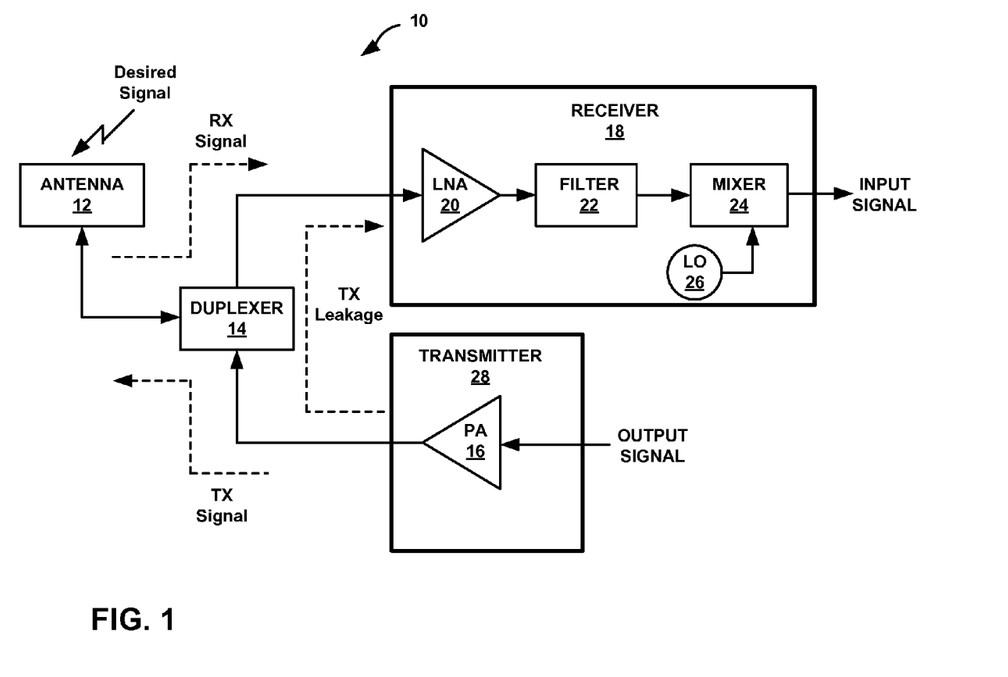
FIG. 1 is a block diagram illustrating an exemplary RF portion of a wireless communication device.

FIG. 1 is a block diagram illustrating an exemplary RF portion of a wireless communication device 10. In the example of FIG. 1, device 10 includes antenna 12, duplexer 14, power amplifier (PA) 16, receiver 18, LNA 20, filter 22, mixer 24, local oscillator (LO) 26, and transmitter 28. In some cases, a baseband filter also may be provided to filter the output of mixer 24.

On the transmit path, power amplifier (PA) 16 within transmitter 28 receives and amplifies an RF transmit signal. The transmit signal may be provided by a modem, and be converted from a digital signal to an analog signal, filtered, and up-converted from a baseband to a transmit band prior to amplification by PA 16. Transmitter 28 may be configured for CDMA communication. The transmit signal is routed through a duplexer 14 and transmitted via an RF antenna 12, e.g., to one or more remote devices, such as a base station. A portion of the transmit signal also leaks through duplexer 14 to the receive path.

On the receive path, a desired, received (RX) signal is received via antenna 12, routed through duplexer 14, and provided to receiver 18. Receiver 18 may be equipped for CDMA communication. In the example of FIG. 1, receiver 18 includes a low noise amplifier (LNA) 20, filter 22, mixer 24 and local oscillator (LO) 24. LNA 20 also receives TX leakage signal from the transmit path, via duplexer 14. Consequently, LNA 20 amplifies both the RX signal and the TX leakage signal. A filter 22 may be provided to filter the amplified RF signal to reduce out of band signal components, including the TX leakage signal, and provide a filtered RF signal.

Mixer 24 receives and frequency down-converts the filtered RF signal from LNA 20. In particular, mixer 24 down-converts the filtered RF signal from the RF band down to a baseband for processing within receiver 18. Mixer 24 may perform the down-conversion by mixing the filtered, amplified signal with a local oscillator (LO) 24 signal selected to achieve the desired baseband frequency. The output of mixer 24 may be converted from an analog signal to a digital signal and processed digitally, e.g., by a modem to demodulate and decode data carried by the signal.

In some cases, filter 22 may be a surface acoustic wave (SAW) filter designed to reject the TX leakage signal. A SAW filter has many advantages such as sharp transition band edges and large attenuation of out-of-band components. Although filter 22 may be effective in removing some of the effects of the TX leakage signal, a significant portion of the TX leakage signal remains and may compromise receiver selectivity.

Figure 2A:
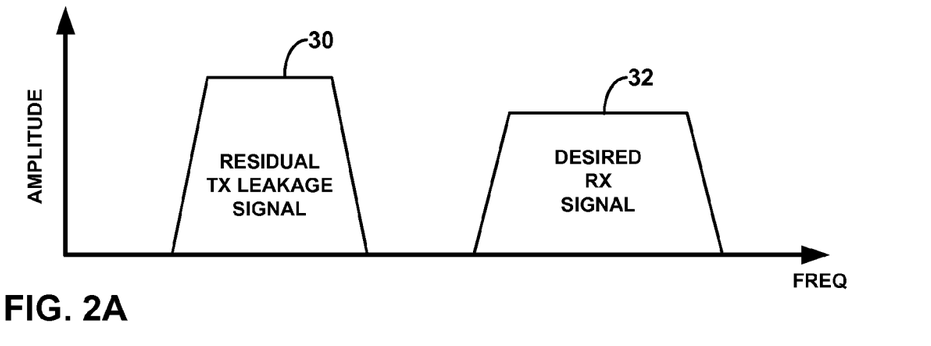
FIGS. 2A and 2B are graphs illustrating signals and distortion components within a receive path of the device of FIG. 1.
Figure 2B:
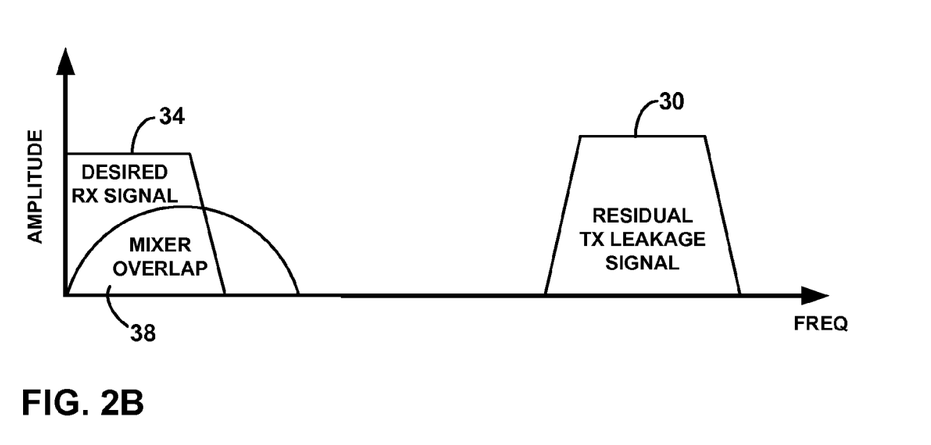

FIGS. 2A and 2B are graphs illustrating signals and distortion components within a receive path of the device 10 of FIG. 1. FIG. 2A shows a received signal at the output of filter 22 in FIG. 1. As shown in FIG. 2A, at the output of filter 22, the received signal comprises a desired RX signal 32 and residual TX leakage signal 30. TX leakage signal 30 and desired RX signal 32 occupy different frequency bands.

FIG. 2B shows the received signal at the output of mixer 24, where the input to mixer 24 is the received signal comprising both the desired RX signal 32 and residual TX leakage signal 30. Ideally, mixer 24 down-converts desired signal 32 to baseband and down-converts residual TX leakage signal 30 to an intermediate frequency, which may be equal to the difference between the local oscillator (LO) frequency and TX RF frequencies. However, mixer 24 is not ideal, and creates second order distortions due to non-linearity.

Non-linearity of mixer 24 can generate second order distortion from the residual TX leakage signal 30. Part of this second order distortion may fall into the baseband of the down-converted, desired RX signal 32. The baseband distortion may be referred to as mixer overlap 38. Mixer overlap 38 acts as additional noise that degrades the receiver sensitivity so that the smallest desired signal that can be reliably detected by the receiver needs to have a larger amplitude.

Figure 3:
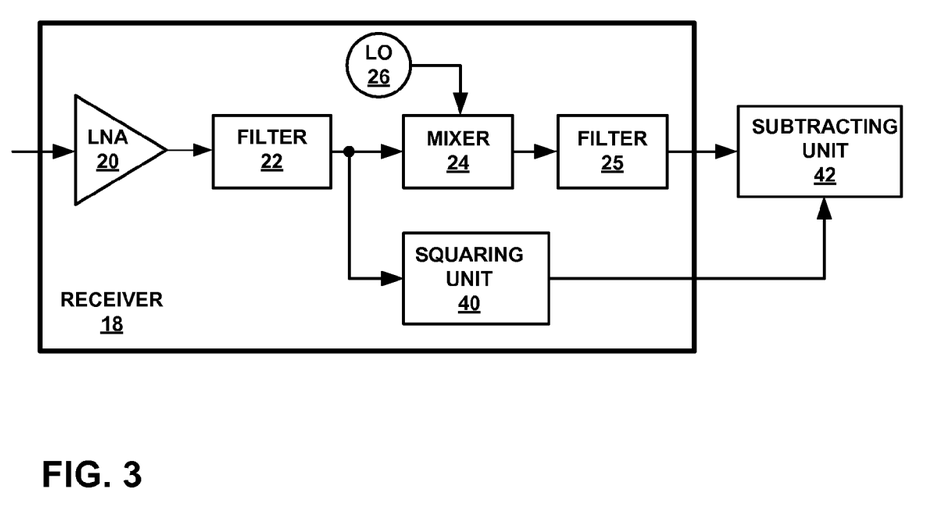
FIG. 3 is a block diagram of an example receiver configured to reduce second order distortion in the receive path of the device of FIG. 1.

FIG. 3 is a block diagram of an example receiver 18 configured to reduce second order distortion in the receive path of the device of FIG. 1. In the example of FIG. 3, receiver 18 includes LNA 20, filter 22, mixer 24, and LO 26. Receiver 18 also may include a baseband filter 25, e.g., coupled to the output of mixer 24. Baseband filter 25 may be configured to remove out-of-band frequencies from the output of mixer 24. As further shown in FIG. 3, to reduce or eliminate second order distortion of transmit signal leakage, receiver 18 may include squaring unit 40 and subtracting unit 42. Subtracting unit 42 may be provided within receiver 26 or be a separate unit coupled to receiver 18.

LNA 20 receives the combined signal that carries desired RX signal 32 and TX leakage signal. Filter 22, coupled to LNA 20, filters desired signal 32 and residual TX leakage signal 30. Mixer 24 then down-converts the filtered signal to baseband by mixing the signal with the LO frequency provided by LO 26. To reduce second order distortion from the TX leakage signal, however, squaring unit 40 squares the filtered signal. Subtracting unit 42 then subtracts the squared signal from the down-converted signal produced by mixer 24. The subtraction serves to cancel much of the second order distortion resulting from application of the TX leakage signal to mixer 24.

Squaring unit 40 may be any semiconductor device exhibiting a strong second order non-linearity. A device with a strong second order non-linearity may exhibit a transfer function with a high gain for its second order term. Hence, squaring unit 40 is selected and/or configured to intentionally generate second order distortions having frequency characteristics similar to mixer overlap 38 (FIG. 2B). The subtraction of squared signal from the down-converted signal in subtracting unit 42 results in a substantial cancellation of the second order distortion.

The outputs of mixer 24 and squaring unit 40 are coupled to subtracting unit 42. Subtracting unit 42 may comprise any device capable of subtracting two signals, either in analog form or digital form. Subtracting unit 42 may subtract the output of squaring unit 40 from the output of mixer 24. As mentioned above, the output of mixer 24 may provide a desired RX signal 32 that is partially masked by mixer overlap 38 caused by the TX leakage signal.

By subtracting the output of squaring unit 40 from the output of mixer 24, the amplitude of mixer overlap 38 may be reduced, causing reduced masking of desired RX signal 32. This reduction in mixer overlap 38 may improve receiver sensitivity because the amplitude of the desired signal that can be reliably detected by the receiver is reduced.

Figure 4:
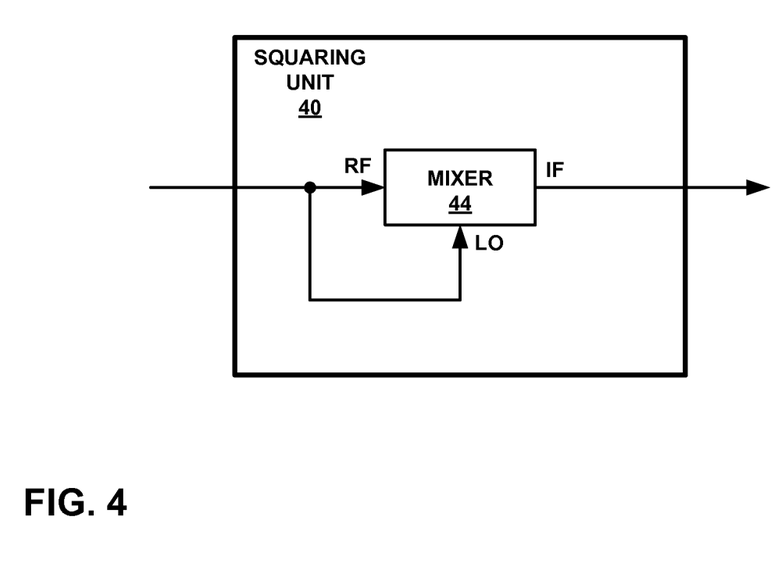
FIG. 4 is a block diagram of an example squaring unit for use in the receiver of FIG. 3.

FIG. 4 is a block diagram of an example squaring unit 40 for use in receiver 18 of FIG. 3. In the example of FIG. 4, squaring unit 40 comprises a mixer 44 with radio frequency (RF) and local oscillator (LO) ports connected together. Mixer 44 may be substantially similar to mixer 24 in frequency response. By coupling the RF input port and LO port together, however, mixer 44 mixes the input signal with itself, providing a squaring effect. The input applied to both the RF and LO ports of mixer 44 may be the output of filter 22 in FIG. 3.

The output of squaring unit 40 may be centered at zero frequency. If mixer 24 is configured as a zero intermediate frequency (ZIF) down-converter, then the IF ports of the mixers 24, 44 simply produce a signal at the desired baseband frequency. If the receiver architecture is heterodyne, more than one frequency conversion stage may be included between filter 22 and subtracting unit 42. Coupling the RF and LO ports of mixer 44 may create strong second order non-linearity that can be subtracted from the second order distortion created by mixer 24 to enhance the selectivity of receiver 18.

Figure 5:
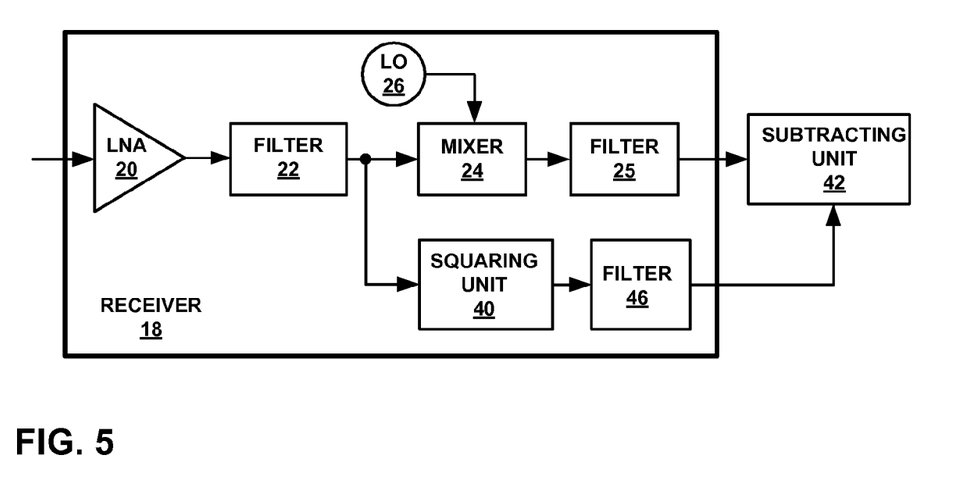
FIG. 5 is a block diagram illustrating further details of an example receiver.

FIG. 5 is a block diagram illustrating further details of an example receiver 18. In FIG. 5, receiver 18 substantially corresponds to the receiver of FIG. 3, but further includes a filter 46 coupled between an output of squaring unit 40 and an input of subtracting unit 42. Filter 46 may be a baseband filter that removes out-of-band frequencies from the output of squaring unit 40.

Figure 6:
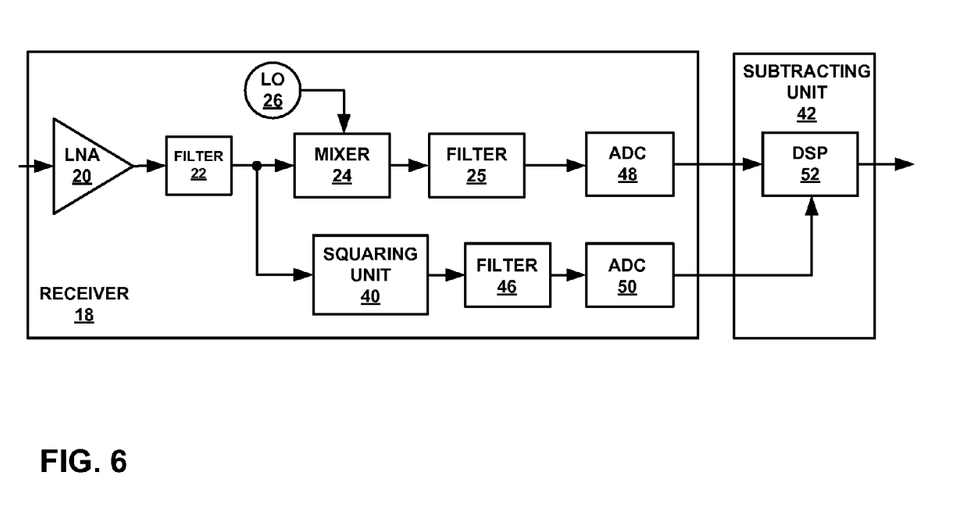
FIG. 6 is a block diagram illustrating additional details of an example receiver in conjunction with a processor-based subtracting unit.

FIG. 6 is a block diagram of another exemplary receiver 26, comprising LNA 20, filter 22, squaring unit 40, mixer 24, filter 25, and filter 46 coupled to subtracting unit 42. As described above, the output of mixer 24 may comprise desired signal 32 partially masked by mixer overlap 38, and the output of squaring unit 40 may be a signal comprising frequency characteristics similar to mixer overlap 38. The output of squaring unit 40 may be filtered by filter 46 to remove out of band frequencies. Filter 46 may be a baseband filter. A wireless receiver, as described in this disclosure, may be applied to a variety of frequency bands. For code division multiple access (CDMA), for example, the receive band may be approximately 869 to 894 MHz, the transmit band may be approximately 824 to 849 MHz, and the baseband may be approximately 0 to 630 kHz. For US PCS, as another example, the receive band may be approximately 1930 to 1990 MHz, the transmit band may be approximately 1850 to 1910 MHz, and the baseband may be approximately 0 to 630 kHz.

In the example of FIG. 6, receiver 18 generally corresponds to the receiver of FIG. 4, but further includes analog-to-digital converter (ADC) 48 and ADC 50. In addition, subtracting unit 42 includes a digital signal processor (DSP). Hence, FIG. 6 illustrates an example in which the output of receiver 18 is converted to digital data prior to the subtraction operation. ADC 48 converts the analog signal output by mixer 24, via optional filter 25, to a first digital signal. ADC 50 converts the analog signal output by squaring unit 40 and optional filter 46 to a second digital signal.

Subtracting unit 42 may include a DSP 52 that receives the first and second digital signals from receiver 18. DSP 52 subtracts the second digital signal produced by squaring unit 40, filter 46 and ADC 50 from the first digital signal produced by mixer 24 and ADC 48 to reduce the second order distortion produced by mixing of the TX leakage signal by mixer 26. For example, DSP 52 may perform the mathematical subtraction operation in the digital domain.

DSP 52 requires digital inputs, but the outputs of mixer 24 and filter 46 may be analog. Accordingly, ADC 48 converts the analog output of mixer 24 into a digital signal, and ADC 50 converts the analog output of filter 46 into a digital signal. Although shown as a separate unit, subtracting unit 42 may form part of receiver 18. In addition, in some cases, subtraction may be performed on analog signals rather than digital signals. The output of DSP 52 may be a digital signal that is processed by a modem to demodulate and decode data carried by the digital signal. The modem may be formed, at least in part, by DSP 52.

Figure 7:
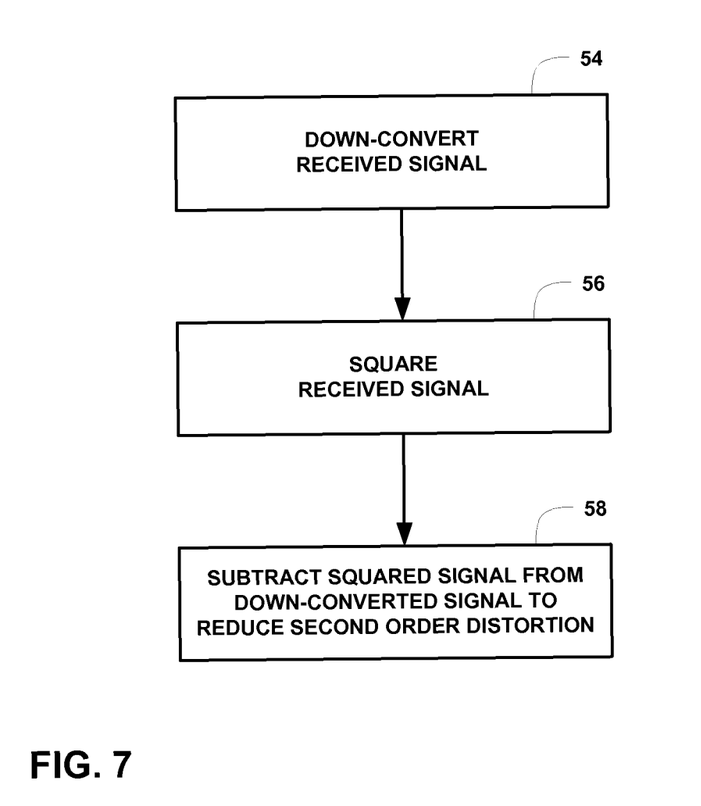
FIG. 7 is a flow diagram illustrating a technique for reduction of second order distortion within a receive path of the device of FIG. 1.

FIG. 7 is a flow diagram illustrating a technique for reduction of second order distortion within a receive path of the device of FIG. 1. As shown in FIG. 7, mixer 24 frequency down-converts a received signal (54). The received signal may include a desired RX signal and a TX leakage signal, and may be amplified by LNA 20 and received via duplexer 14. Squaring unit 40 squares the received signal (56). Subtracting unit 42 subtracts the squared received signal from the down-converted received signal (58) to reduce second order distortion.

In some cases, the techniques described in this disclosure may be used in full-duplex wireless communication systems. In each case, the receiver and transmitter section may be operational simultaneously. During such operation, a portion of the transmit signal may leak into the receive path. This leaked signal may be filtered, but there may remain some residual leaked signal. Second order distortions caused by a mixer may transfer the residual leaked signal into the frequency band of the desired signal, thus partially masking the desired signal and reducing receiver sensitivity. By intentionally creating a separate signal with second order distortion, and subtracting it from the output of the mixer, the second order distortion caused by the mixer may be reduced to increase receiver sensitivity.

Various aspects of the disclosure have been described. The foregoing description has been presented for the purposes of illustration, and is not intended to be exhaustive or limiting. Many modifications and variations are possible within the scope of the following claims.

The invention claimed is:

1. A wireless receiver comprising:
   a mixer in a down-converting path that down-converts an amplified and filtered input signal to create a down-converted input signal having a desired portion and an undesired portion;
   a squaring unit that squares the amplified and filtered input signal by mixing independent of the down-converting path the amplified and filtered input signal with itself to create a squared input signal having an undesired portion, the squaring unit including another mixer having a radio-frequency (RF) input and a local oscillator (LO) input coupled together and configured to receive the amplified and filtered input signal; and a subtracting unit that subtracts the squared input signal having the undesired portion from the down-converted input signal having the desired portion and the undesired portion.

2. The receiver of claim 1, wherein the mixer is a first mixer, and wherein the squaring unit comprises a second mixer with a radio frequency (RF) port and a local oscillator (LO) port coupled to one another.

3. The receiver of claim 1, further comprising:
an antenna;
a duplexer coupled to the antenna; and
a low noise amplifier having an input coupled to the duplexer and an output coupled to apply the amplified and filtered input signal to the mixer,
wherein the duplexer passes a transmit leakage signal to the low noise amplifier.

4. The receiver of claim 3, further comprising a filter coupled between the low noise amplifier and the mixer.

5. The receiver of claim 4, wherein the filter comprises a radio frequency (RF) surface acoustic wave (SAW) filter.

6. The receiver of claim 1, further comprising:
a first analog-to-digital converter (ADC) that digitizes the down-converted input signal; and
a second ADC that digitizes the squared input signal.

7. The receiver of claim 6, wherein the subtracting unit comprises a digital signal processor (DSP) that subtracts the digitized squared input signal from the digitized, down-converted input signal.

8. The receiver of claim 1, further comprising:
a first analog-to-digital converter (ADC) that digitizes the down-converted input signal;
a baseband filter that filters the squared input signal to create a filtered squared input signal; and
a second ADC that digitizes the filtered squared input signal.

9. The receiver of claim 8, wherein the subtracting unit comprises a digital signal processor (DSP) that subtracts the digitized, filtered, squared input signal from the digitized, down-converted input signal.

10. A method comprising:
down-converting in a down-converting path an amplified and filtered input signal to create a down-converted input signal having a desired portion and an undesired portion;
squaring the amplified and filtered input signal by mixing independent of the down-converting path the amplified and filtered input signal with itself via a mixer having a radio-frequency (RF) input coupled to a local oscillator (LO) input to create a squared input signal having an undesired portion; and
subtracting the squared input signal having the undesired portion from the down-converted input signal having the desired portion and the undesired portion.

11. The method of claim 10, wherein squaring the input signal comprises squaring the amplified and filtered input signal with a squaring unit, and wherein the squaring unit comprises a mixer with a radio frequency (RF) port and a local oscillator (LO) port coupled to one another.

12. The method of claim 10, wherein down-converting the amplified and filtered input signal comprises down-converting the amplified and filtered input signal via a mixer, the method further comprising receiving an input signal via an antenna, a duplexer coupled to the antenna, and a low noise amplifier having an input coupled to the duplexer and an output, wherein the duplexer passes a transmit leakage signal to the low noise amplifier.

13. The method of claim 12, further comprising filtering the input signal with a filter coupled between the output of the low noise amplifier and the mixer to generate the amplified and filtered input signal.

14. The method of claim 13, wherein the filter comprises a radio frequency (RF) surface acoustic wave (SAW) filter.

15. The method of claim 10, further comprising:
digitizing the down-converted input signal; and
digitizing the squared input signal,
wherein subtracting the squared input signal from the down-converted input signal comprises subtracting the digitized squared input signal from the digitized, down-converted input signal.

16. The method of claim 15, further comprising filtering the squared input signal to create a filtered squared input signal, wherein digitizing the squared input signal comprises digitizing the filtered squared input signal.

17. A device comprising:
means for down-converting in a down-converting path an amplified and filtered input signal to create a down-converted input signal having a desired portion and an undesired portion;
means for squaring the amplified and filtered input signal by mixing independent of the down-converting path the amplified and filtered input signal with itself via a mixer having a radio-frequency (RF) input coupled to a local oscillator (LO) input to create a squared input signal having an undesired portion; and
means for subtracting the squared input signal having the undesired portion from the down-converted input signal having the desired portion and the undesired portion.

18. The device of claim 17, wherein the means for squaring comprises a mixer with a radio frequency (RF) port and a local oscillator (LO) port coupled to one another.

19. The device of claim 17, further comprising:
means for digitizing the down-converted input signal; and
means for digitizing the squared input signal,
wherein the means for subtracting the squared input signal from the down-converted input signal comprises means for subtracting the digitized squared input signal from the digitized, down-converted input signal.

20. The device of claim 19, further comprising means for filtering the squared input signal to create a filtered squared input signal, wherein the means for digitizing the squared input signal comprises means for digitizing the filtered squared input signal.

21. A wireless communication device comprising:
a radio frequency (RF) transmitter;
an RF receiver;
an RF antenna; and
a duplexer that couples the transmitter and the receiver to the antenna,
wherein the duplexer passes a transmit leakage signal to the RF receiver, and
wherein the RF receiver comprises:
a mixer in a down-converting path that down-converts an amplified and filtered input signal to create a down-converted input signal having a desired portion and an undesired portion;
a squaring unit that squares the amplified and filtered input signal by mixing independent of the down-converting path the amplified and filtered input signal with itself to create a squared input signal having an undesired portion, the squaring unit including another mixer having a radio-frequency (RF) input and a local oscillator (LO) input coupled together and configured to receive the amplified and filtered input signal; and a subtracting unit that subtracts the squared input signal having the undesired portion from the down-converted input signal having the desired portion and the undesired portion.

22. The device of claim 21, wherein the transmitter is a code division multiple access (CDMA) transmitter and the receiver is a CDMA receiver.

23. The device of claim 21, wherein the mixer is a first mixer, and wherein the squaring unit comprises a second mixer with a radio frequency (RF) port and a local oscillator (LO) port coupled to one another.

24. The device of claim 21, wherein the RF receiver further comprises:

a low noise amplifier having an input coupled to the duplexer and an output; and a filter coupled between the output of the low noise amplifier and the mixer.

25. The device of claim 24, wherein the filter comprises a radio frequency (RF) surface acoustic wave (SAW) filter.

26. The device of claim 21, wherein the RF receiver further comprises:

a first analog-to-digital converter (ADC) that digitizes the down-converted input signal; and a second ADC that digitizes the squared input signal.

27. The device of claim 26, wherein the subtracting unit comprises a digital signal processor (DSP) that subtracts the digitized squared input signal from the digitized, down-converted input signal.

28. The device of claim 21, wherein the receiver further comprises:

a first analog-to-digital converter (ADC) that digitizes the down-converted input signal;

a baseband filter that filters the squared input signal to create a filtered squared input signal; and a second ADC that digitize the filtered squared input signal.

29. The device of claim 28, wherein the subtracting unit comprises a digital signal processor (DSP) that subtracts the digitized, filtered, squared input signal from the digitized, down-converted input signal.

30. A wireless receiver comprising:

an antenna;

a duplexer coupled to the antenna;

a low noise amplifier coupled to amplify an input signal received via the duplexer and the antenna, wherein the duplexer passes a transmit leakage signal to the low noise amplifier;

a filter that filters the amplified input signal to generate an amplified and filtered input signal;

a mixer in a down-converting path that down-converts the amplified and filtered input signal to create a down-converted input signal having a desired portion and an undesired portion;

a squaring unit having a frequency response substantially similar to a frequency response of the mixer and configured to square the amplified and filtered input signal by mixing independent of the down-converting path the amplified and filtered input signal with itself to create a squared input signal having an undesired portion, the squaring unit including another mixer having a radio-frequency (RF) input and a local oscillator (LO) input coupled together and configured to receive the amplified and filtered input signal; and a subtracting unit that subtracts the squared input signal having the undesired portion from the down-converted input signal having the desired portion and the undesired portion.

* * * * *